United States Patent
Lamb (10) Patent No.: US 9,274,219 B2
(45) Date of Patent: Mar. 1, 2016

(54) APPARATUS AND METHOD FOR SHORT DWELL INVERSE SYNTHETIC APERTURE RADAR (ISAR) IMAGING OF TURNING MOVING VEHICLES

(76) Inventor: Brian M. Lamb, Manhattan Beach, CA (US)

( * ) Notice: Subject to any disclaimer, the term of this patent is extended or adjusted under 35 U.S.C. 154(b) by 309 days.

(21) Appl. No.: 13/539,472

(22) Filed: Jul. 1, 2012

(65) Prior Publication Data

US 2013/0009807 A1 Jan. 10, 2013

Related U.S. Application Data

(60) Provisional application No. 61/571,882, filed on Jul. 7, 2011.

(51) Int. Cl.
G01S 13/90 (2006.01)
G01S 13/524 (2006.01)

(52) U.S. Cl.
CPC ......... G01S 13/9035 (2013.01); G01S 13/5242 (2013.01)

(58) Field of Classification Search
CPC .............. G01S 13/524; G01S 13/5242; G01S 13/90–13/9094; G01S 2013/90–2013/9088
USPC ............................................... 342/25 R–25 F
See application file for complete search history.

(56) References Cited

U.S. PATENT DOCUMENTS

| | | | |
|---|---|---|---|
| 4,924,229 A | | 5/1990 | Eichel |
| 5,063,524 A | * | 11/1991 | Ferre et al. ..................... 382/107 |
| 5,179,383 A | * | 1/1993 | Raney et al. ................. 342/25 D |
| 5,627,543 A | * | 5/1997 | Moreira ....................... 342/25 A |
| 5,812,082 A | * | 9/1998 | Moreira et al. ............. 342/25 A |
| 5,818,383 A | | 10/1998 | Stockburger |
| 5,910,785 A | * | 6/1999 | Normant ..................... 342/25 A |
| 5,959,566 A | * | 9/1999 | Petty ............................ 342/25 B |
| 6,072,419 A | * | 6/2000 | Normant ..................... 342/25 F |
| 6,377,206 B1 | * | 4/2002 | Petty ............................. 342/159 |
| 6,608,584 B1 | * | 8/2003 | Faulkner ..................... 342/25 R |
| 6,661,369 B1 | * | 12/2003 | Cho ............................. 342/25 R |
| 6,781,541 B1 | * | 8/2004 | Cho ............................. 342/25 D |

(Continued)

OTHER PUBLICATIONS

C.V. Jakowatz Jr., D.E. Wahl, P.H. Eichel, D.G. Ghiglia, P.A. Thompson, Spotlight Mode Synthetic Aperture Radar: A Signal Processing Approach, ISBN 0-7923-9677-4 Springer Science+Business Media, Inc., 1996, Chapter 4 (pp. 221-271).
W.G. Carrera, R.S. Goodman, R.M. Majewski, Spotlight Synthetic Aperture Radar Signal Processing Algorithms, ISBN 0-89006-728-7, Artech House Inc., 1995, Chapter 6 (pp. 245-284).
Hough Transform—Wikipedia (printed Aug. 26, 2012).
D.E. Wahl, P.H. Eichel, D.C. Ghiglia, and C.V. Jakowitz Jr., Phase Gradient Autofocus—A Robust Tool for High Resolution SAR Phase Correction, IEEE Transactions on Aerospace and Electronic Systems, vol. 30, No. 3, pp. 827-834, Jul. 1994.

(Continued)

Primary Examiner — Matthew M Barker
(74) Attorney, Agent, or Firm — Arlyn Alonzo; Alonzo & Associates (57) ABSTRACT

An apparatus and method for generating a radar image including acquiring a first plurality of data in a first domain, wherein one or more of the first plurality of data include data of a moving target engaged in a turning motion at a rotational rate greater than a threshold; converting the first plurality of data from the first domain to a second plurality of data in a second domain, wherein the second domain is a first two-dimensional transformation of the first domain; extracting one or more of the second plurality of data; converting the one or more of the extracted second plurality of data to a third plurality of data in a third domain, wherein the third domain is a second two-dimensional transformation of the second domain; phase compensating the third plurality of data; and transforming the phase compensated third plurality of data to generate the radar image.

44 Claims, 6 Drawing Sheets

(56) References Cited

U.S. PATENT DOCUMENTS

| | | | |
|---|---|---|---|
| 7,106,243 B2 * | 9/2006 | Krikorian et al. | 342/25 B |
| 7,456,780 B1 * | 11/2008 | Garren | 342/25 A |
| 7,589,662 B1 * | 9/2009 | Hulbert et al. | 342/25 R |
| 8,203,481 B2 * | 6/2012 | Wintermantel et al. | 342/112 |
| 2013/0028327 A1 * | 1/2013 | Narroschke et al. | 375/240.16 |

OTHER PUBLICATIONS

Warren C. Brown and Dennis C. Ghiglia, Some Methods for Reducing Propagation-induced Phase Errors in Coherent Imaging Systems, I. Formalism, Journal of the Optical Society of America, vol. 5, No. 6, pp. 924-941, Jun. 1988.

* cited by examiner

APPARATUS AND METHOD FOR SHORT DWELL INVERSE SYNTHETIC APERTURE RADAR (ISAR) IMAGING OF TURNING MOVING VEHICLES

CLAIM OF PRIORITY UNDER 35 U.S.C. §119

The present application for patent claims priority to Provisional Application No. 61/571,882 entitled "Short dwell Inverse Synthetic Aperture Imaging of Turning Ground Vehicles" filed Jul. 7, 2011, and assigned to the assignee hereof and hereby expressly incorporated by reference herein.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Contract No. FA8750-09-C-0121 awarded by the U.S. Air Force.

FIELD

This disclosure relates generally to apparatus and methods for radar signal processing. More particularly, the disclosure relates to obtaining two-dimensional radar images of moving vehicles using radar signal processing.

BACKGROUND

To obtain two-dimensional radar images of moving vehicles is desirable to support, for example, automated target recognition (ATR), automated target classification (ATC) or feature-aided tracking (FAT). The creation of tactically useful two-dimensional radar images of moving vehicles from airborne or spaceborne platforms has been challenging. For example, the presence of uncompensated residual motion errors destroys the coherence of the radar data and can result in severe radar image degradation.

The yield and/or quality of tactically useful two-dimensional radar images of moving vehicles has historically been very low and hence ATR, ATC and FAT for moving vehicles has instead concentrated on exploitation of one-dimensional high range resolution (HRR) profiles. Unfortunately, these one-dimensional HRR profiles do not contain as much information as two-dimensional radar images, they decorrelate more rapidly over viewing aspect and time than two-dimensional (2D) radar images, and extensive training data must be continually collected.

The background art is characterized by U.S. Pat. Nos. 4,924,229 and 5,818,383; the disclosures of which patents are incorporated by reference as if fully set forth herein. The background art is also characterized by the following publications: C. V. Jakowatz Jr., D. E. Wahl, P. H. Eichel, D. G. Ghiglia, P. A. Thompson, *Spotlight Mode Synthetic Aperture Radar: A Signal Processing Approach*, ISBN 0-7923-9677-4 Kluwer Academic Publishers, 1996: and W. G. Carrera, R. S. Goodman, R. M. Majewski, *Spotlight Synthetic Aperture Radar Signal Processing Algorithms*, ISBN 0-89006-728-7, Artech House Inc., 1995.

SUMMARY

Disclosed is an apparatus and method for generating a radar image. According to one aspect, a method for generating a radar image including acquiring a first plurality of data in a first domain, wherein one or more of the first plurality of data include data of a moving target engaged in a turning motion at a rotational rate greater than a threshold; converting the first plurality of data from the first domain to a second plurality of data in a second domain, wherein the second domain is a first two-dimensional transformation of the first domain; extracting one or more of the second plurality of data; converting the one or more of the extracted second plurality of data to a third plurality of data in a third domain, wherein the third domain is a second two-dimensional transformation of the second domain; phase compensating the third plurality of data; and transforming the phase compensated third plurality of data to generate the radar image.

According to another aspect, an apparatus for generating a radar image, including a receiver for acquiring a first plurality of data in a first domain, wherein one or more of the first plurality of data include data of a moving target engaged in a turning motion at a rotational rate greater than a threshold; and a processor coupled with a memory storing software codes, wherein the software codes are instructions implemented by the processor for: a) converting the first plurality of data from the first domain to a second plurality of data in a second domain, wherein the second domain is a first two-dimensional transformation of the first domain; b) extracting one or more of the second plurality of data; c) converting the one or more of the extracted second plurality of data to a third plurality of data in a third domain, wherein the third domain is a second two-dimensional transformation of the second domain; d) phase compensating the third plurality of data; and e) transforming the phase compensated third plurality of data to generate the radar image.

Advantages of the present disclosure may include using minimal radar resources, attainment of high sensor area coverage rates, improved prediction of when a high value target moving vehicle is likely to encounter a turn and improved ability to schedule a wideband radar waveform for creation of a two-dimensional inverse synthetic aperture radar (ISAR) image.

It is understood that other aspects will become readily apparent to those skilled in the art from the following detailed description, wherein it is shown and described various aspects by way of illustration. The drawings and detailed description are to be regarded as illustrative in nature and not as restrictive.

DETAILED DESCRIPTION

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the present disclosure.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Two-dimensional radar imaging requires transmission of a wide bandwidth radar waveform to obtain resolution in the range direction and a diversity of viewing aspects to obtain resolution in the cross range, or azimuth, direction. In one example, a cross range resolution of one foot by a X-band radar requires viewing the target over a viewing aspect span of between two and three degrees.

Due to the long stand-off ranges of typical airborne radar systems, this viewing aspect span necessitates a relatively long radar dwell of several seconds or more if the moving vehicle is moving in a relatively straight path. In this situation, the target viewing aspect span arises primarily from the motion of the radar platform and radar practitioners typically refer to this imaging modality as Synthetic Aperture Radar (SAR). Alternatively, if the moving vehicle is making a turn, a one-foot resolution radar image may be made using a short radar dwell such as 150 milliseconds (ms) or less. Since the viewing aspect span required for attainment of cross range resolution arises primarily from the target motion, this imaging modality is referred to as an Inverse Synthetic Aperture Image (ISAR). To create high-quality moving vehicle radar images, the unknown motion of the moving vehicle must be adaptively deduced from analysis of radar data with an accuracy of about a fraction of a radar wavelength.

In one example, during a turn, moving vehicles will typically change aspect at a rate between 10 and 20 degrees/second (deg/sec). In one example, the moving vehicles are moving ground vehicles. Short radar dwells, on the order of 150 milliseconds, for example, afforded by the target turning motion specifically facilitates the creation of high-quality two-dimensional radar images. In one aspect, low order polynomial phase errors are more readily compensated than sinusoidal phase errors. The short coherent dwell transfers many of the dominant spectral components of the vehicle's unknown motion dynamics from sinusoidal phase errors to low-order polynomial phase errors. Autofocus techniques may be used to create high-quality two-dimensional radar images in the presence of arbitrarily large low-order polynomial phase errors.

Alternatively, known autofocus techniques do not perform well when attempting to create high-quality two-dimensional radar images of non-turning moving vehicles from typical airborne or spaceborne radar systems due to the presence of these unknown sinusoidal phase errors. Adaptive motion compensation for sinusoidal phase errors may be challenging whereas motion compensation for low order polynomial errors may be more straightforward. Although phase error estimation techniques, such as Phase Gradient Autofocus (PGA), may in principle measure high order phase errors in ground terrain radar images, these techniques may not reliably measure unknown phase errors in radar images of moving vehicles well enough to make high-quality two-dimensional radar images when dwells are long.

The term "two-dimensional radar images of turning moving vehicles" may also be referred to as "Short Dwell ISAR Imaging of Moving vehicles".

In one aspect, the disclosure provides an improved method and system for creation of high-quality two-dimensional radar images of non-instrumented moving vehicles. These images may be used to enhance the tracking of moving vehicles by radar, target classification of moving vehicles, or automated target recognition of moving vehicles.

An illustrative disclosure is an improved method and system for making high-quality two-dimensional radar images of moving vehicles that exploits vehicle maneuvers or turns. This example requires a short radar dwell due to the exploitation of vehicle maneuvers or turns.

One example is a method for creating a two-dimensional radar image of a target (e.g., a turning or maneuvering moving vehicle), the method including: tracking the target with a radar apparatus under the control of a sensor resource manager; designating the target as a high value target; performing kinematic tracking of the high value target with a feature-aided tracker and using a road network database to determine if the high value target is on a road; optionally collecting wideband high range resolution profiles of the high value target and potential confusers and using the wideband high range resolution profiles to train a high range resolution fingerprinter apparatus during time periods when there is increased ambiguity in the track of the high value target; during periods of increased ambiguity concerning the track of the high value target, using the high range resolution fingerprinter apparatus to compute likelihood scores to improve the detection to high value target track accuracy (improve the association of detections to tracks) by the feature-aided tracker apparatus; using the feature-aided tracker apparatus to spawn multiple association hypotheses using a common multiple hypothesis tracker formalism; using a short dwell ISAR apparatus for resolution of the hypotheses by creating short dwell ISAR images of the high value target and the potential confusers when the sensor resource manager predicts that the high value vehicle and the potential confusers are likely to execute a turn on the road; using the sensor resource manager to schedule a wideband waveform during each predicted turn with a duration that is sufficient to obtain each turn angle required for desired crossrange resolution; using the short dwell ISAR apparatus to produce images of the high value target and the potential confusers; using a vehicle feature extraction apparatus to extract features from the images of said high value target and the potential confusers, allowing for turn rate estimation errors; and using the features to assist the feature-aided tracker apparatus to produce a track of the high value target.

In one example, a method for automatically recognizing a target or classifying a target, the method including: using a radar apparatus under the control of a sensor resource manager, using a narrowband waveform to kinematically track moving vehicles in the vicinity of a turn in a road, wherein when a particular vehicle approaches the turn, scheduling the radar apparatus to illuminate the turn with a wideband waveform; with a short dwell ISAR apparatus, creating images of the moving vehicles; and using an automated target recognition apparatus in conjunction with an automated target recognition database to produce a target identification or target classification.

In another example, a method for producing a radar image of a high value target, the method including: using a radar apparatus to track the high value target: using a sensor resource manager to predict when the high value target is likely to turn and scheduling a wideband radar waveform to collect data on the high value target during the turn; processing the data into a short dwell moving vehicle ISAR image; using the sensor resource manager to produce an estimate of the range, range rate and turn rate of the high value target based on kinematic track or road network information; using the radar apparatus to use the wideband waveform to illuminate the high value vehicle during the turn to produce phase history data; estimating the phase center position of the radar apparatus versus time; optionally applying a platform motion compensation correction to the phase history data to produce platform motion compensated phase history data; correcting the platform motion compensated phase history data for the range rate to produce coarse motion compensated phase history data; range and azimuth compressing the coarse motion compensated phase history data to produce a range Doppler image; isolating a high value target blur from the range Doppler image; inverting the range and azimuth compression of the high value target blur to produce filtered phase history data for the high value target; and using adaptive motion compensation technique to produce a focused moving vehicle ISAR image of the high value target.

In one example, a method for producing a radar image of a high value target from down sampled phase history data that has been obtained with a radar apparatus under the control of a sensor resource manager, the method including: executing on a computing system software instructions that cause the computing system to execute a process including: applying a phase correction to the down sampled phase history data to produce phase corrected phase history data; producing an initial estimate of the range rate of the high value target if the range rate has not been estimated by the sensor resource manager: in a loop, using phase correction parameters to apply a low-order parametric polynomial phase correction to the phase corrected phase history data to produce a corrected image; in the loop, applying range and azimuth discrete Fourier transforms to the corrected image to produce a transformed image; in the loop, computing an entropy of the transformed image and computing the partial derivatives of the entropy with respect to the phase correction parameters; determining whether a stop criterion has been satisfied; if the stop criterion has not been satisfied, refining the phase correction parameters and repeating the steps in the loop; and if the stop criterion has been satisfied, producing a moving vehicle ISAR image.

For example, the method may further include: after the stop criterion has been satisfied, applying a phase gradient autofocus to the transformed image to produce a phase gradient autofocused image; determining whether the phase gradient autofocus has improved the entropy; if the phase gradient autofocus has improved the entropy, using the phase gradient autofocused image to produce the moving vehicle ISAR image; and if the phase gradient autofocus has not improved the entropy, produce the moving vehicle ISAR image without using phase gradient autofocus.

In one example, a system for creating a two-dimensional radar image of a target (e.g., a turning or maneuvering moving vehicle), the system including: means for tracking the target with a radar apparatus under the control of a sensor resource manager; means for designating the target as a high value target; means for performing kinematic tracking of the high value target with a feature-aided tracker and using a road network database to determine if the high value target is on a road; optionally, means for collecting wideband high range resolution profiles of the high value target and potential confusers and using the wideband high range resolution profiles to train a high range resolution fingerprinter apparatus during time periods when there is reduced ambiguity in the track of the high value target; means for, during periods of increased ambiguity concerning the track of the high value target, using the high range resolution fingerprinter apparatus to compute likelihood scores to improve the detection to high value target track accuracy (improve the association of detections to tracks) by the feature-aided tracker apparatus; means for using the feature-aided tracker apparatus to spawn multiple association hypotheses using a common multiple hypothesis tracker formalism; means for using a short dwell ISAR apparatus for resolution of the hypotheses by creating short dwell ISAR images of the high value target and the potential confusers when the sensor resource manager predicts that the high value vehicle and the potential confusers are likely to execute a turn on the road; means for using the sensor resource manager to schedule a wideband waveform during each predicted turn with a duration that is sufficient to obtain each turn angle required for desired crossrange resolution: means for using the short dwell ISAR apparatus to produce images of the high value target and the potential confusers; means using a vehicle feature extraction apparatus to extract features from the images of the high value target and the potential confusers, allowing for turn rate errors; and means for using the features to assist the feature-aided tracker apparatus to produce a track of the high value target.

In one example, a system for automatically recognizing a target or classifying a target, the system including: means for using a narrowband waveform to kinematically track moving vehicles in the vicinity of a turn in a road, the means for using includes a radar apparatus under the control of a sensor resource manager; means for scheduling the radar apparatus to use a wideband waveform to track the particular vehicle when a particular vehicle approaches the turn; means for creating images of the moving vehicles including with a short dwell ISAR apparatus; and means for using an automated target recognition apparatus in conjunction with an automated target recognition database to produce a target identification or target classification.

In one example, a system for producing a radar image of a high value target, the system including: means for using a radar apparatus to track the high value target; means for using a sensor resource manager to predict when the high value target is likely to turn and scheduling a wideband radar waveform to collect data on the high value target during the turn; means for processing the data into a short dwell moving vehicle ISAR image; means for using the sensor resource manager to produce an estimate of the range, range rate and turn rate of the high value target based on kinematic track or road network information means for using the radar apparatus to use the wideband waveform to illuminate the high value vehicle during the turn to produce phase history data; means for estimating the phase center position of the radar apparatus versus time; means for optionally applying a platform motion compensation correction to the phase history data to produce platform motion compensated phase history data; means for correcting the platform motion compensated phase history data for the range rate to produce coarse motion compensated phase history data; means for range and azimuth compressing the coarse motion compensated phase history data to produce a range Doppler image; means for isolating a high value target blur from the range Doppler image; means for inverting the range and azimuth compression of the high value target blur to produce filtered phase history data for the high value target; and means for using adaptive motion compensation technique to produce a focused moving vehicle ISAR image of the high value target.

In one example a system for producing a radar image of a high value target from down sampled phase history data that has been obtained with a radar apparatus under the control of a sensor resource manager, the system including: a computing system executing software instructions that cause the computing system to execute a process including: applying a phase correction to the down sampled phase history data to produce phase corrected phase history data; producing an initial estimate of the range rate of the high value target if the range rate has not been estimated by the sensor resource manager; in a loop, using phase correction parameters to apply a low-order parametric polynomial phase correction to the phase corrected phase history data to produce a corrected image; in the loop, applying range and azimuth discrete Fourier transforms to the corrected image to produce a transformed image; in the loop, computing an entropy of the transformed image and computing the partial derivatives of the entropy with respect to the phase correction parameters; determining whether a stop criterion has been satisfied; if the stop criterion has not been satisfied, refining the phase correction parameters and repeating the steps in the loop; and if the stop criterion has been satisfied, producing a moving vehicle ISAR image.

In one example, the process may further include: after the stop criterion has been satisfied, applying a phase gradient autofocus to the transformed image to produce a phase gradient autofocused image; determining whether the phase gradient autofocus has improved the entropy; if the phase gradient autofocus has improved the entropy, using the phase gradient autofocused image to produce the moving vehicle ISAR image; and if the phase gradient autofocus has not improved the entropy, using the transformed image to produce the moving vehicle ISAR image.

Figure 1:
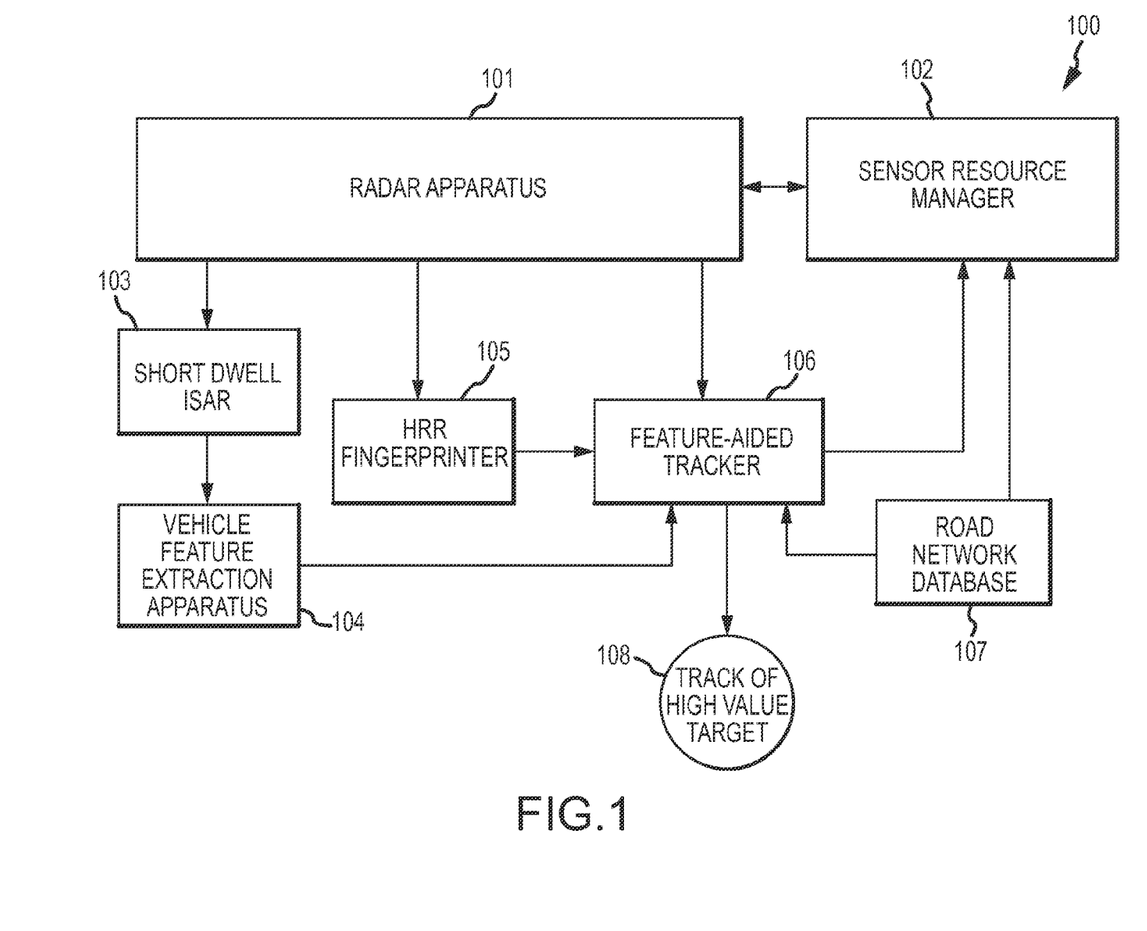
FIG. 1 is a block diagram illustrating a first example of a short dwell inverse synthetic aperture radar (ISAR) imaging system.

FIG. 1 is a block diagram illustrating a first example of a short dwell inverse synthetic aperture radar (TSAR) imaging system 100. In one example, an application of the block diagram illustrated in FIG. 1 is for radar feature-aided tracking of moving vehicles. In another example, an application may be for automated target recognition or target classification of moving vehicles.

As illustrated in FIG. 1, the short dwell ISAR imaging system 100 includes a radar apparatus 101 which may include equipment for basic radar functions such as radar waveform generation and radar echo reception. Radar apparatus 101 is coupled to and controlled by sensor resource manager 102. Radar apparatus 101 is also coupled to short dwell ISAR 103, used for short dwell ISAR image generation. Radar apparatus 101 is also coupled to high resolution (HRR) fingerprinter 105, used for identifying a high value target (HVT) through exploitation of high range resolution (HRR) features. And, radar apparatus 101 is also coupled to feature-aided tracker 106, used for tracking of the HVT using radar features. Imaging products from the short dwell ISAR 103 are fed to vehicle feature extraction apparatus 104 to extract vehicle features. The vehicle feature extraction apparatus 104 is coupled to the feature-aided tracker 106, to assist in tracking of the HVT. The feature-aided tracker 106 is coupled to the sensor resource manager 102. In addition, the sensor resource manager is coupled to a road network database 107 for information on roads so that HVT turns may be predicted. The feature-aided tracker apparatus 106 produces a track of high-value target 108.

In one example, accurate tracking of moving vehicles is an important mission for airborne Intelligence Surveillance Reconnaissance (ISR) radar systems. For example, a radar tracking method may rely on kinematic information solely, i.e., through the use of angle, range, and range rate of a tracked vehicle. Errors in the association of new radar measurements with an existing track occur when the density of moving vehicles becomes too high. To mitigate this effect, the use of radar features may be used to disambiguate between confuser vehicles.

Examples of such radar features include length, width, arrangement of scatterers, and radar cross section (RCS). This operation is referred to as feature-aided tracking. Feature-aided tracking may be implemented through the collection and exploitation of High Range Resolution (HRR) features. In FIG. 1, HRR fingerprinter apparatus 105 performs this operation. One application of the present disclosure may be to either replace or augment this operation by using two-dimensional moving vehicle ISAR features through short dwell ISAR apparatus 103 and vehicle feature extraction apparatus 104 of FIG. 1.

In one example, the radar apparatus 101 may be an airborne or a spaceborne radar apparatus. The radar apparatus 101 is controlled by sensor resource manager (SRM) 102 to track a High Value Target (HVT). In one example, the HVT is the tracked vehicle. Upon designation of the HVT, feature-aided tracker apparatus 106 initiates kinematic tracking of a HVT track. Feature-aided tracker apparatus 106 uses a road network database to determine if the HVT track is on a road. If the HVT track is determined to be on a road, road information is used to assist in the propagation of the track between radar revisits. SRM 102 optionally periodically commands radar apparatus 101 to collect wideband High Range Resolution (HRR) profiles of both the HVT and potential confuser vehicles. These HRR profiles are used to train HRR fingerprinter apparatus 105 during periods when there is a high-confidence track of the HVT. During periods of potential ambiguity in association of target detections to the HVT track, HRR fingerprinter apparatus 105 computes likelihood scores to improve detection to HVT track accuracy by feature-aided tracker apparatus 106.

In one example, there may still be some ambiguity in association of detections to tracks, especially when the density of confuser vehicles is high. Feature-aided tracker apparatus 106 spawns multiple association hypotheses using, for example, a common multiple hypothesis tracker (MHT) formalism. Short dwell ISAR apparatus 103 assists in hypothesis resolution by creating two-dimensional radar images, for example, short dwell ISAR images of the HVT and potential confuser vehicles when SRM 102 predicts a moving vehicle wilt likely execute a turn based upon information from the road network database 107.

In one aspect, a two-dimensional radar image is a representation of radar backscatter levels as a function of two dimensions. In one example, one dimension is denoted as range or fast time, and is generally in the direction of a radar antenna boresight. In another example, another dimension is denoted as crossrange, Doppler, azimuth or slow time, and is generally orthogonal to the radar antenna boresight. SRM 102 schedules a wideband waveform during the predicted turn with a sufficient duration to obtain the turn angle required for the desired crossrange resolution. Short dwell ISAR apparatus 103 processes radar data into high quality moving vehicle short dwell ISAR images. Features are extracted from these ISAR images by vehicle feature extraction apparatus 104 and used to assist feature-aided tracker apparatus 106 in producing a track of high-value target 108. Although the Sensor Resource Manager 102 and feature aided tracker apparatus 106 provide an estimate of the effective moving vehicle turn rate relative to the radar, there may be some turn rate error and hence some uncertainty in the cross range pixel size of the short dwell ISAR image. This uncertainty is allowed for in the extraction of moving vehicle ISAR features by vehicle feature extraction apparatus 104.

In one example, the sensor resource manager (SRM) 102 that is tracking a high value target predicts when the high value target (HVT) being tracked may turn. In one example, SRM 102 may anticipate a turn in a road, assuming knowledge of the road network, or a potential turn at an intersection. SRM 102 then schedules a wideband radar waveform to collect data that is processed into a two-dimensional radar image, such as a short dwell ISAR image of a moving vehicle. SRM 102 also provides an estimate of the HVT range, range rate, and turn rate based upon kinematic track and/or road network information. SRM 102 commands radar apparatus 101 such that the wideband waveform illuminates the HVT during this turn. This wideband waveform has a sufficiently long dwell duration to observe the HVT over a sufficient angular span, based upon the predicted turn rate, to attain the desired cross range resolution. As an example, attainment of one-foot cross range resolution with an X-band radar system requires a coherent dwell of approximately 0.15 second for a HVT with a turn rate of 20 deg/sec for an equivalent rotation angle of 3 degrees. Cross range resolution is inversely proportional to the equivalent rotation angle.

Figure 2:
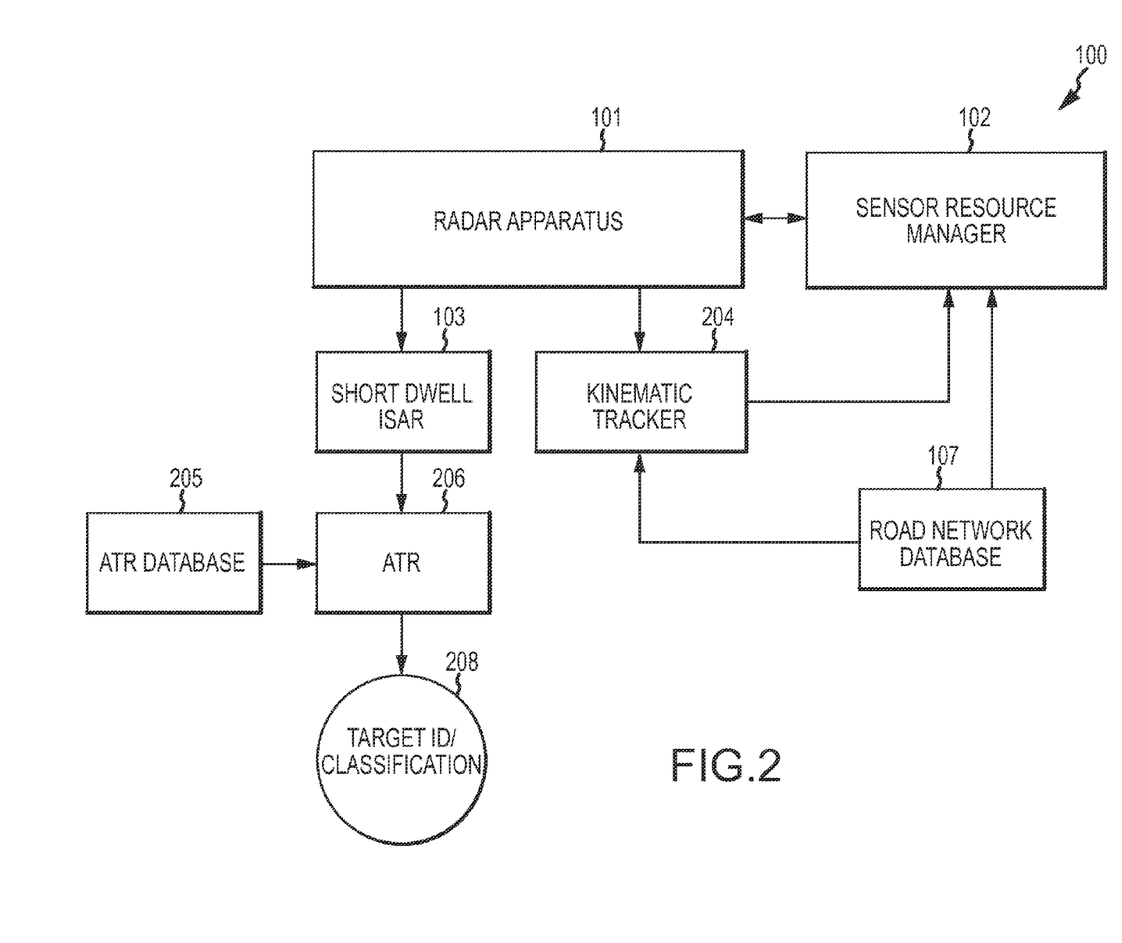
FIG. 2 is a block diagram illustrating a second example of a short dwell inverse synthetic aperture radar (ISAR) imaging system.

FIG. 2 is a block diagram illustrating a second example of a short dwell inverse synthetic aperture radar (ISAR) imaging system. Common elements with FIG. 1 include radar apparatus 101, sensor resource manager 102, short dwell ISAR 103 and road network database 107. In addition, radar apparatus 101 is coupled to kinematic tracker 204, used to assist in tracking of the HVT. The kinematic tracker 204 is also coupled to sensor resource manager 102 and to road network database 107. Short dwell ISAR 103 is coupled to automated target recognition (ATR) module 206 for automatic target recognition. ATR module 206 is coupled an automated target recognition (ATR) database 205 to assist in automatic target recognition. ATR module 206 outputs target identification/classification data 208.

Referring to FIG. 2, an alternate example of an automated target recognition (ATR)/automated target classification (ATC) application for system 100 is illustrated. This application is configured similarly to the feature-aided tracking configuration except that the end goal is ATR or ATC of moving vehicles. In this example, a narrowband waveform is used to kinematically track moving vehicles in the vicinity of a turn in a road. When a vehicle approaches the turn, SRM 102 schedules radar apparatus 101 to use a wideband waveform. Short dwell ISAR apparatus 103 creates high-quality moving vehicle short dwell ISAR images. ATR apparatus 206 performs and outputs target identification/target classification 208 through the use of ATR database 205.

Figure 3:
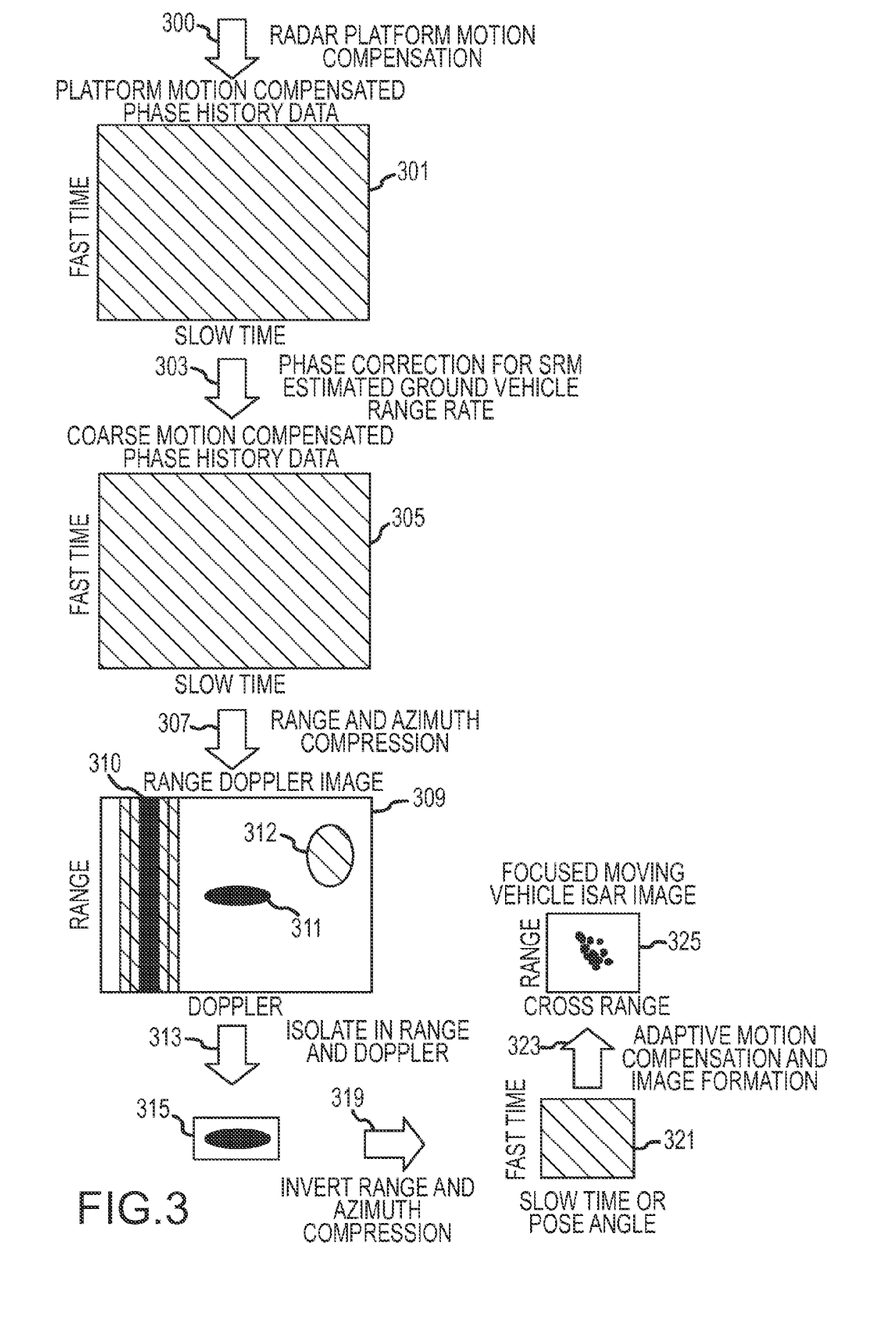
FIG. 3 is a flow diagram illustrating a first example of a short dwell inverse synthetic aperture radar (ISAR) imaging system.

FIG. 3 is a flow diagram illustrating a first example of a short dwell inverse synthetic aperture radar (ISAR) imaging system. FIG. 3 is comprised of platform motion compensation step 300, which produces platform motion compensated phase history data 301; phase correction step 303, which produces coarse motion compensated phase history data 305; and range and azimuth compression step 307, which produces a range Doppler image 309. Range Doppler image 309 is comprised of range-aligned ground clutter streak 310, high value target (HVT) range Doppler blur 311, and other moving vehicle blur 312. In one example, in the phase correction step 303, phase correction for SRM estimated ground vehicle range rate may be performed.

Next. FIG. 3 continues with isolate in range and Doppler step 313, which produces moving vehicle range Doppler blur 315; inversion of range and azimuth Fourier transform step 319 produces filtered phase history data 321; and adaptive motion compensation and image formation step 323 produces a focused moving target image 325. Two example dimensions of the filtered phase history data 321 are fast time and slow time (or pose angle). Two example dimensions of the focused moving target image 325 are range and cross range.

In one example, the radar apparatus 101 includes motion measurement equipment that provides an estimate of radar antenna phase center position versus time. These data are used to apply a platform motion compensation correction to the phase history data radar platform motion compensation step 300 of FIG. 3 to produce platform motion compensated phase history data 301. Although in some examples, step 300 may be optional for making short dwell ISAR images of moving vehicles, when coupled with phase correction step 303, its performance assists in identification and extraction of the HVT range Doppler blur.

Also, the platform motion compensated phase history data may be dechirped to compress the data in the range dimension. The dechirped and platform motion compensated phase history is shown as platform motion compensated phase history data 301 in FIG. 3. Platform motion compensated phase history data 301 are shown as a two-dimensional data array of samples in fast time and slow time. In one example, fast time corresponds to the range dimension and slow time corresponds to the cross-range or azimuth dimension.

In one example, radar apparatus 101 obtains fine range resolution by employing linear frequency modulating (e.g. chirp) long pulses. Upon reception, the returned radar signal is de-chirped. Dechirping is accomplished either by analog or digital procedures. In one example, an analog procedure includes mixing the returned radar signal with delayed in-phase and quadrature versions of the transmitted signal, low-pass filtering, digital sampling, and Fourier transforming.

In another example, a digital procedure is performed subsequent to digital sampling through digital matched filter processing. Digital matched filter processing includes digital convolution with a time-reversed complex conjugated replica of the transmitted signal followed by a Fourier transform. In either case, the end result is complex digitized platform motion compensated phase history data 301. Platform motion compensation (platform motion compensation step 300) is performed by phase adjusting the phase history data to make the radar return for a stationary ground reference point phase coherent.

One skilled in the art would understand that many other techniques are possible other than a linear frequency chirp to obtain the radar bandwidth required for fine range resolution. For example, other suitable waveforms for fine range resolution may include nonlinear frequency modulation, nonlinear chirp, stretch, binary phase coding, polyphase coding, etc. These other techniques also produce phase history data in the format of phase history data 301 and accordingly, the teachings described herein are applicable to the products of these other techniques.

In one example, the phase correction step 303 applies a coarse motion compensation for the SRM predicted offset of the HVT from the ground reference point as a function of slow time. In one example, the coarse motion compensation is a multiplicative phase correction given by $$\exp\left(\frac{4mR_m}{c}(f_c + \Delta f(n - N/2)/N)\right) \quad (1)$$

in which $R_m$ is the SRM-predicted slant range offset between the HVT and the ground reference point as a function of slow time sample index m, c is the speed of light, $f_c$ is the radar waveform center frequency, $\Delta f$ is the radar waveform bandwidth, n is the fast time index, and N is the number of fast time samples. Note that the sign of i may need to be negated (made negative) depending upon the phase convention used in the phase history data. If so, then the sign of i also needs to be negated in all subsequent equations. The result of this operation is coarse motion compensated phase history data 305 shown in FIG. 3. In one example, the predicted moving vehicle slant range offset $R_m$ is fit to a linear function of the slow time index m prior to application of phase correction step 303.

In one example, coarse motion compensated phase history data are range and azimuth compressed as in range and azimuth compression step 307 of FIG. 3. In an alternative example, step 307 is performed by multiplication by a two-dimensional windowing function followed by a two-dimensional discrete Fourier transform (DFT). In one example, the discrete Fourier transform is performed by a Fast Fourier Transform (FFT). The resulting range Doppler image 309 is shown in FIG. 3, which illustrates the HVT range Doppler blur 311 for HVT moving vehicle.

This HVT range Doppler blur 311 is centered at the position in range and Doppler at which a phase coherent target is expected to appear. The blurred HVT range Doppler image appears at this location as a result of the platform motion compensation to a ground reference point and the subsequent coarse motion compensation in phase correction step 303 for the slant range offset of the HVT from the ground reference point. The blurred HVT range Doppler image will appear at a different location if these steps have not been performed. In particular, the term proportional to $f_c$ in Equation 1 is chosen to translate the HVT range Doppler blur at zero Doppler and the term proportional to $\Delta f$ has translated the HVT blur to the ground reference range position.

In one example, the HVT range Doppler image is blurred due to the unknown motion of this moving vehicle during the radar dwell. The process for adaptive motion compensation for this unknown motion is described in FIG. 4.

The translation of the HVT range Doppler blur 311 to zero Doppler by Equation 1 has translated the range-aligned ground clutter streak 310 to a non-zero Doppler value. The range Doppler image 309 in FIG. 3 illustrates a situation in which there is a significant exoclutter region in the Doppler span. This may occur when the radar pulse repetition frequency is sufficiently high and/or when the radar line-of-sight is sufficiently close to the radar platform velocity vector. Although this situation may often be achieved for forward-looking radar systems, it is rarely achieved for side-looking radar systems. In the side-looking situation, multiple antenna phase center techniques are typically used to significantly cancel the return from stationary ground clutter sources. In one example, such techniques maybe applied prior to the performance of phase correction step 303 in FIG. 3.

Range Doppler blurs from other moving vehicles may appear at other range and/or Doppler positions such as that shown for other moving vehicle blur 312. It is shown blurred more in range because its range walk is typically not matched by the SRM's HVT range rate correction as performed in step 303.

In one example, a gate, or crop, in range and Doppler is placed about the range Doppler blur closest to zero Doppler and the reference range position to isolate in range and Doppler step 313 of FIG. 3 resulting in range Doppler image that has been cropped about moving vehicle range Doppler blur 315. Radar practitioners will realize that this step of isolating the HVT range Doppler blur 311 may be performed in many ways other than cropping. Although a true cropping operation is used in the illustrative example disclosed herein, system 100 may perform a more careful delineation of the boundary of this target blur and zero out everything outside this boundary.

In one example, the boundary may be irregularly shaped (rather than rectangular) and the operation may entail setting everything outside this region to zero rather than cropping the array size. Delineation may also include a mix of zero fill and cropping. Range and azimuth compression is inverted in inversion of range and azimuth Fourier transform step 419 of FIG. 4 through inverse discrete Fourier transforms along the range and Doppler dimensions resulting in filtered phase history data 321 for a high value target (HVT).

As discussed previously in one example, SRM 102 is tracking the HVT and knows its approximate location along a road. Accordingly, SRM 102 knows the approximate viewing pose angle of the HVT relative to the radar as a function of slow time and may alternatively express the horizontal axis of filtered phase history data 321 in terms of vehicle pose angle. Since moving vehicles typically make turns at turn rates of between 10 and 20 degrees/second, between 1 and 2 degrees of turning HVT angle span is likely during a typical radar dwell of 0.1 seconds. If the predicted angle span is greater than the angle span required for the desired ISAR cross range resolution, the dwell time is reduced through processing a contiguous subset of the slow time axis of filtered phase history data 321 that results in the desired pose angle span.

Adaptive motion compensation techniques, as illustrated in adaptive motion compensation and image formation step 323 of in FIG. 3, may be used to deduce the residual unknown moving vehicle center of mass motion and to phase compensate the filtered phase history data. In one aspect, the adaptive motion compensation technique includes data driven motion compensation, for example, derived solely from analysis of received radar data. Although a constant range rate motion compensation may have been applied to the filtered phase history data 321 as in phase correction step 303 of FIG. 3, in order to obtain a tactically useful moving vehicle image, the moving vehicle center of mass motion must be adaptively deduced to within a small fraction of the radar wavelength, using an adaptive motion compensation technique. In particular, even small slow time frequency phase errors may cause severe cross range smearing of the ISAR image. Thus, exploiting the turning motion of moving vehicles is included. The turning motion facilitates collection of a sufficient turn angle for cross range resolution in a short coherent dwell which in turn reduces the number of cycles of these phase error components over the dwell time. This reduces the severity of ISAR image degradation.

Adaptive motion compensation techniques may include prominent point, map drift, range profile correlation over slow time. In one example, a low order polynomial range motion with coefficients determined through image entropy minimization works well for autofocusing X-band or Ku-band ISAR images of turning moving vehicles on short dwells. Although this low order parametric polynomial motion model typically works well alone, in one example, it may be followed by a phase gradient autofocus (PGA) operation (not shown). The image entropy metric may be used to assess if PGA has improved the image focus. If the entropy is improved by PGA, it is used, if not, PGA is not applied. In one example, improvements from PGA may be achieved.

Although there may be some variation of effective target rotation rate relative to the radar platform, due to the inertia of moving vehicles and the short dwells considered herein, it may not be necessary to consider non-uniformity of vehicle rotation rate relative to the radar. In one example, data correction for non-uniform rotation rate is not performed.

Figure 4:
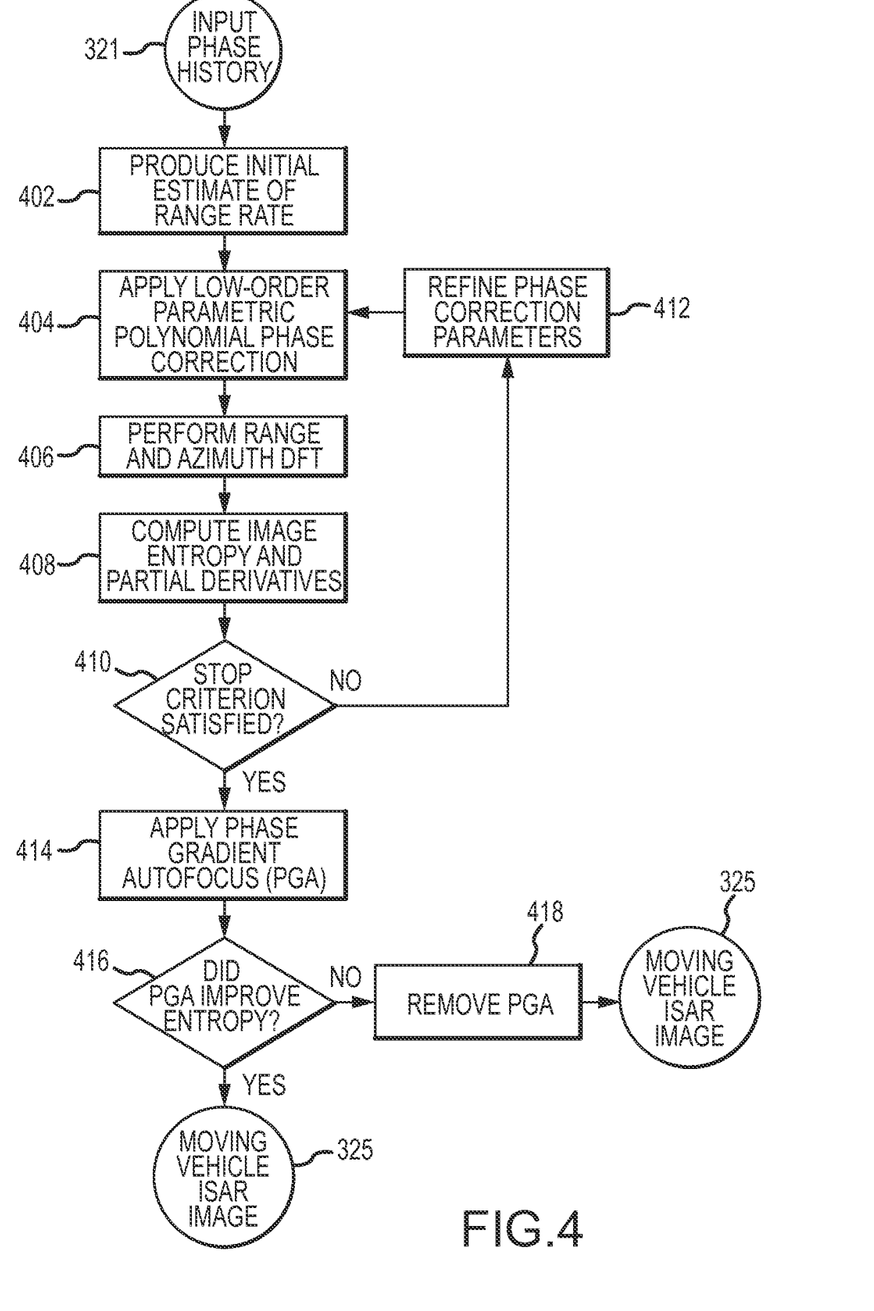
FIG. 4 is a flow diagram illustrating a second example of a short dwell inverse synthetic aperture radar (ISAR) imaging system.

FIG. 4 is a flow diagram illustrating a second example of a short dwell inverse synthetic aperture radar (ISAR) imaging system. FIG. 4 is comprised of initial estimate of range rate step 402, which uses the filtered phase history data 321 as input; apply low-order parametric polynomial phase correction step 404; perform range and azimuth discrete Fourier transform (DFT) step 406; compute image entropy and partial derivatives step 408; determine if stop criterion is satisfied step 410; apply phase gradient autofocus (PGA) step 414; determine if PGA improved entropy step 416; remove PGA step 418, which is applied if the answer to step 416 is no. If the answer to step 416 is yes, output a moving vehicle ISAR image 325. The output of FIG. 4 in either case of step 416 is a moving vehicle ISAR image 325. Also, if the answer to step 410 is no, proceed to refine phase correction parameters step 412, which loops back to step 404.

In one example, phase correction is applied to the filtered phase history data 321 of FIG. 4. This phase correction takes the same form as Equation 1 except that the number of fast time samples N may be reduced and the number of slow time samples I may also be reduced. This reduction in number of samples is due to isolate in range and Doppler step 313 (a.k.a., cropping process) of FIG. 3 to crop, or isolate, in range and Doppler dimensions. In step 313 the HVT residual slant range $R_m$ target motion may be represented as a low order polynomial in the slow time index in, i.e., $$R_m = \alpha_1 m + \alpha_2 m^2 + \alpha_3 m^3 + \ldots \quad (2)$$

Alternate examples may use other functional forms for the low order phase errors. In one example, the image entropy S is defined as $$S = -\Sigma_{kl} P_{ij} \ln(P_{ij}) \quad (3)$$

in which the sum is over all image pixel indices i, j and the normalized pixel values $P_{kl}$ are given by $$P_{kl} = \frac{|p_{kl}|^2}{\Sigma_{kl} |p_{kl}|^2} \quad (4)$$

In Equation 4, $p_{kl}$ is the complex image pixel value at range bin 1 and cross range bin k. It another example, another logarithmic function may be substituted for the natural logarithm (ln) in equation 3. The polynomial coefficients in Equation 2 may be adjusted to minimize the image entropy S. The image entropy is a highly nonlinear function of the polynomial coefficients. An example method for choosing these polynomial coefficients is illustrated herein.

Although excellent results have been obtained with phase correction polynomial orders between third and fifth order, other examples may use other functional or mathematical forms for these phase errors and still be within the scope and spirit of the present disclosure. In one example, during the initial time though this loop, the values for all polynomial coefficients are set to zero except possibly for $\alpha_1$ range rate coefficient. An initial estimate of this residual range rate may be determined in produce initial estimate of range rate step 402 of FIG. 4.

In one example, the phase history data have had a range rate correction applied in phase correction step 303 of FIG. 3 based upon the HVT motion estimated by SRM 102. Since this range rate estimate may be in error, an optional step is to estimate the residual range rate in produce initial estimate of range rate step 402 of FIG. 4 to determine an initial estimate of $\alpha_1$. In one example, this option is used if SRM 102 has not provided an estimate of target motion as in phase correction step 303 of FIG. 3.

Several techniques may be used to produce the initial estimate of range rate. In one example, range compression may be applied and the range rate derived through a Hough transform. The Hough transform is described in "Machine Analysis of Bubble Chamber Pictures" by P. V. C. Hough, presented at the Proc. Int. Conf. High Energy Accelerators and Instrumentation, 1959, the disclosure of which is incorporated by reference as if fully set forth herein.

Alternatively, the range rate may be determined from a short-time fast Fourier transform (FFT) or the Wigner-Ville Distribution. One skilled in the art would understand that other methods may also be used and are within the scope and spirit of the present disclosure.

The polynomial phase correction defined by Equations 1 and 2 may be applied in apply low-order polynomial phase correction step 404 of FIG. 4 and range and azimuth discrete Fourier transforms (DFT) are applied in range and azimuth Fourier transform step 406 of FIG. 4. In one example, the DFT may be performed through a Fast Fourier Transform (FFT).

In one example, the image entropy S and its partial derivatives with respect to all polynomial coefficients (phase correction parameters) are computed through application of Equations 3 and 4 and the following equation:

$$\frac{\partial S}{\partial a_i} \approx \frac{-B\pi f_c}{cM} \sum_{kl} k^i \mathrm{Im}\{\tilde{p}_{kl} \tilde{z}_{kl}^*\} \quad (5)$$

in which m is the slow time index, M is the number of cross range pixels, l is the range bin index, the tilde represents the discrete Fourier transform over cross range pixels defined through $$\tilde{p}_{kl} = \sum_m p_{ml} \exp\left(-\frac{2\pi i m k}{M}\right) \quad (6)$$

and $z_{ml}$ is defined through $$z_{ml} = \frac{p_{ml}\log(|p_{ml}|^2)}{\sum_{ml}|p_{ml}|^2} \qquad (7)$$

Numerous methods are available to obtain an acceptable set of polynomial coefficients (phase correction parameters). One method includes performing a sequential search for each coefficient starting with the coefficient for the lowest order. A parameter increment is chosen and the coefficient is incremented by the chosen increment along the direction of decreasing image entropy partial derivative in phase correction parameters step 412 in FIG. 4. An image is created in perform range and azimuth Fourier transform step 406 in FIG. 4 with the new polynomial phase error correction used in apply low-order polynomial phase correction step 404 in FIG. 4 and entropy and partial derivatives recomputed in compute image entropy and partial derivatives (of image entropy with respect to phase correction parameters) step 408 in FIG. 4.

In one example, each time the partial derivative direction changes, the parameter increment is divided by three, or another integer. This loop proceeds until the parameter increment reaches a selected minimum value. In one example, a minimal parameter increment is one tenth the initial parameter increment value. In one example, after sequentially iterating through all parameters twice, an acceptable solution is found. One skilled in the art would understand that other example techniques of performing the nonlinear parameter search may be used and still be within the scope and spirit of the present disclosure.

In one aspect, the stop criterion used in test for stop criterion step 410 of FIG. 4 may be based upon a fixed number of iterations for each focusing parameter, a minimum incremental improvement in image entropy, a minimum parameter change, or a combination thereof. One skilled in the art would understand that other examples of stop criterion may be used and still be within the scope and spirit of the present disclosure.

In one example, a Phase Gradient Autofocus (PGA) algorithm may then optionally be applied as in apply phase gradient autofocus step 414 of FIG. 4. A PGA algorithm is described in U.S. Pat. No. 4,924,229 and in "Phase Gradient Autofocus—A Robust Tool for High Resolution SAR Phase Correction", by D. E. Wahl, P. H. Eichel, D. C. Ghiglia, and C. V. Jakowitz Jr. in IEEE Transactions on Aerospace and Electronic Systems, Vol. 30, No. 3, pp. 827-834, July 1994; the disclosures of which references are incorporated by reference as if fully set forth herein.

PGA tends to be most effective when target migration through range bins are eliminated through the low order parametric phase error correction. The image quality metric prior to and subsequent to application of PGA is compared in determine if PGA improve entropy step 416 of FIG. 4. If the image quality metric is degraded by application of PGA, the phase correction derived from PGA is removed as in remove PGA (if it did not improve image entropy) step 418 of FIG. 4. In this case, the final slant plane ISAR image is output as focused moving vehicle ISAR image 325 of FIG. 3. If PGA has produced an improvement in image quality, the final slant plane ISAR image is output as focused moving vehicle ISAR image 325.

Figure 5:
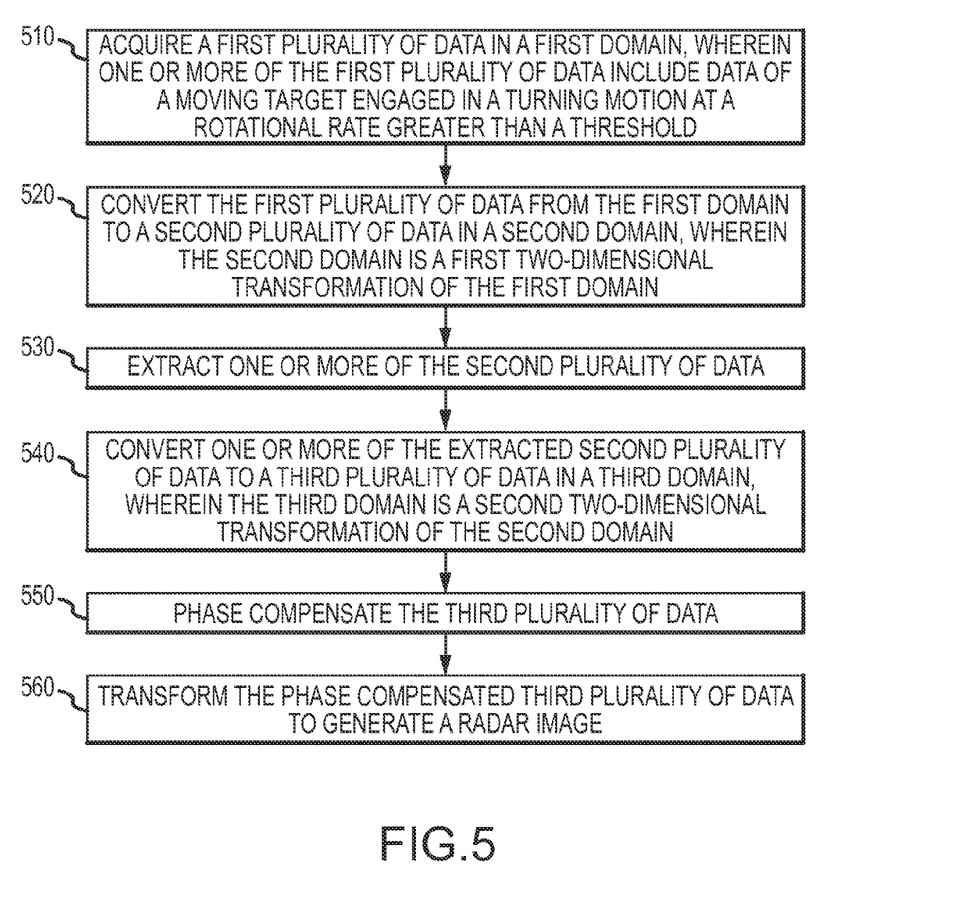
FIG. 5 is a flow diagram illustrating a third example of a short dwell inverse synthetic aperture radar (ISAR) imaging system.

FIG. 5 is a flow diagram illustrating a third example of a short dwell inverse synthetic aperture radar (ISAR) imaging system. In step 510, acquire a first plurality of data in a first domain, wherein one or more of the first plurality of data include data of a moving target engaged in a turning motion at a rotational rate greater than a threshold. In one example, the threshold is one of the following: 5 degrees per second, 10 degrees per second, or between 1 degree per second and 20 degrees per second. In one example, the moving target is a ground moving target. In one aspect, the step 510 is performed by a receiver or a receiving component in a transceiver.

In one example, the turning motion at a rotational rate greater than a threshold is predicted by a resource manager. In another example, the prediction by the resource manager is based on a road network database or other a priori information. In one example, the first domain includes a fast time dimension and a slow time dimension. In another example, the first plurality of data includes platform motion compensated phase history data acquired by radar apparatus 101. In another example, the first plurality of data includes data which has included a clutter cancellation step. In one example, the first domain is indexed by fast time and slow time.

In step 520, convert the first plurality of data from the first domain to a second plurality of data in a second domain, wherein the second domain is a first two-dimensional transformation of the first domain. In one example, the second domain includes a range dimension and a Doppler (azimuth) dimension. In another example, the first plurality of data and the second plurality of data are related by a first functional transformation.

In another example, the second plurality of data is a range Doppler image. In another example, the first two-dimensional transformation includes a range compression step and a Doppler (azimuth) compression step. In another example, the range Doppler image includes a high value target (HVT) range Doppler blur. In one example, the second domain is indexed by range and Doppler.

In step 530, extract one or more of the second plurality of data. In one example, the extract step includes cropping the second plurality of data to isolate a HVT range Doppler blur. In another example, the extract step includes setting values of the second plurality of data outside a boundary of the HVT range Doppler blur to zero.

In step 540, convert one or more of the extracted second plurality of data to a third plurality of data in a third domain, wherein the third domain is a second two-dimensional transformation of the second domain. In one example, the third domain includes a fast time dimension and a slow time dimension. In another example, the third domain includes a fast time dimension and a pose angle dimension. In another example, the third plurality of data is filtered phase history data. In another example, the convert step includes an inverse range compression and an inverse azimuth (Doppler) compression. In another example, the inverse range compression and inverse azimuth compression are implemented via an inverse discrete Fourier transform (IDFT). In another example, the extracted second plurality of data and the third plurality of data are related by a second functional transformation.

In step 550, phase compensate the third plurality of data. In one example, the phase compensate step includes representing range motion with a low order polynomial. In another example, the coefficients of the low order polynomial may be determined through image entropy minimization. In one example, the phase compensating step includes one or more of the following: applying a parametric polynomial phase correction; eliminating one or more of range walk, range curvature, or higher order range motion; and applying phase gradient autofocus.

In step 560, transform the phase compensated third plurality of data to generate a radar image. In one example, the radar image is generated after adaptive motion compensation is applied to the phase compensated third plurality of data. In another example, the adaptive motion compensation includes a phase correction iteration using image entropy and partial derivatives. In another example, the adaptive motion compensation includes prominent point, map drift, range profile correlation, etc. In another example, the adaptive motion compensation includes a phase gradient autofocus (PGA) step. In another example, the radar image is generated as a function of range and crossrange. In one example, the transforming step includes performing one or more of the following: Fourier transformation; amplitude weighting; aperture weighting; apodization; or Doppler to cross-range transformation. In one aspect, the steps 520 through 560 are performed by a processor.

In one example, the flow diagram of FIG. 5 further includes the step of using a cartographic database to determine that the moving target is engaged in the turning motion. The cartographic database is used to predict a likely turn. It can also be used to improve the estimate of turn rate for subsequent short-dwell ISAR processing. In one example, the flow diagram of FIG. 5 further includes the step of measuring Doppler broadening of the moving target. In one example, the flow diagram of FIG. 5 further includes the step of computing an image quality metric of the radar image.

In one example, the flow diagram of FIG. 5 further includes the step of detecting and tracking the moving target to generate tracking data. In one example, the tracking data is one of the following: a) used for the extracting one or more of the second plurality of data, b) used for transforming the phase compensated third plurality of data to generate the radar image, or c) used for determining that the moving target is engaged in the turning motion. In one example, the flow diagram of FIG. 5 further includes the step of using a spatial radar feature of the moving target for tracking. In one example, the spatial radar feature is one of the following: length, width, length profile, width profile, or spatial amplitude distribution.

In one example, the flow diagram of FIG. 5 further includes the step of identifying the radar image as a particular ground vehicle. In one example, the flow diagram of FIG. 5 further includes the step of classifying the radar image into a predefined ground vehicle category.

In one aspect of ISAR image exploitation purposes, project the image onto the ground plane. The grazing angle, tilt angle, and possible image shear angle are computed and used in this example. In one example, a projection into the ground plane step is performed by the procedures described in Appendix C of the publication: CV. Jakowatz Jr., D. E. Wahl, P. H. Eichel, D. G. Ghiglia, P. A. Thompson, *Spotlight Mode Synthetic Aperture Radar: A Signal Processing Approach*, ISBN 0-7923-9677-4 Kluwer Academic Publishers, 1996; the disclosure of which reference is incorporated by reference as if fully set forth herein.

Many other variations of the present disclosure may occur to those skilled in the art. Some variations include differing methods for the adaptive motion compensation process. Due to the short coherent radar dwells considered herein, the performance disclosed herein is not highly sensitive to the exact details of the adaptive motion compensation techniques described herein. Other variations call for compensation for variations in target rotational rate relative to the radar. All such variations are intended to be within the scope and spirit of the present disclosure.

Although some examples are shown to include certain features or steps, any of the features or steps disclosed herein may be used together or in combination with any other feature or step on any example of the present disclosure. It is also contemplated that any feature or step may be specifically excluded from any examples of the present disclosure.

In alternative examples, the adaptive motion compensation may be performed through the map drift method or through use of the Wigner Ville distribution. These techniques are described in "Some Methods For Reducing Propagation-induced Phase Errors in Coherent Imaging Systems, I. Formalism." by Warren C. Brown and Dennis C. Ghiglia, published June 1988 in the Journal of the Optical Society of America, Vol. 5; the disclosure of which reference is incorporated by reference as if fully set forth herein.

One skilled in the art would understand that the steps disclosed in the example flow diagrams in FIGS. 3-5 can be interchanged in their order without departing from the scope and spirit of the present disclosure. Also, one skilled in the art would understand that the steps illustrated in the flow diagram are not exclusive and other steps may be included or one or more of the steps in the example flow diagram may be deleted without affecting the scope and spirit of the present disclosure.

Those of skill would further appreciate that the various illustrative components, logical blocks, modules, circuits, and/or algorithm steps described in connection with the examples disclosed herein may be implemented as electronic hardware, firmware, computer software, or combinations thereof. To clearly illustrate this interchangeability of hardware, firmware and software, various illustrative components, blocks, modules, circuits, and/or algorithm steps have been described above generally in terms of their functionality. Whether such functionality is implemented as hardware, firmware or software depends upon the particular application and design constraints imposed on the overall system. Skilled artisans may implement the described functionality in varying ways for each particular application, but such implementation decisions should not be interpreted as causing a departure from the scope or spirit of the present disclosure.

For example, for a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described therein, or a combination thereof. With software, the implementation may be through modules (e.g., procedures, functions, etc.) that perform the functions described therein. The software codes may be stored in memory units and executed by a processor unit. Additionally, the various illustrative flow diagrams, logical blocks, modules and/or algorithm steps described herein may also be coded as computer-readable instructions carried on any computer-readable medium known in the art or implemented in any computer program product known in the art. In one aspect, the computer-readable medium includes non-transitory computer-readable medium.

In one or more examples, the steps or functions described herein may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media may include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Figure 6:
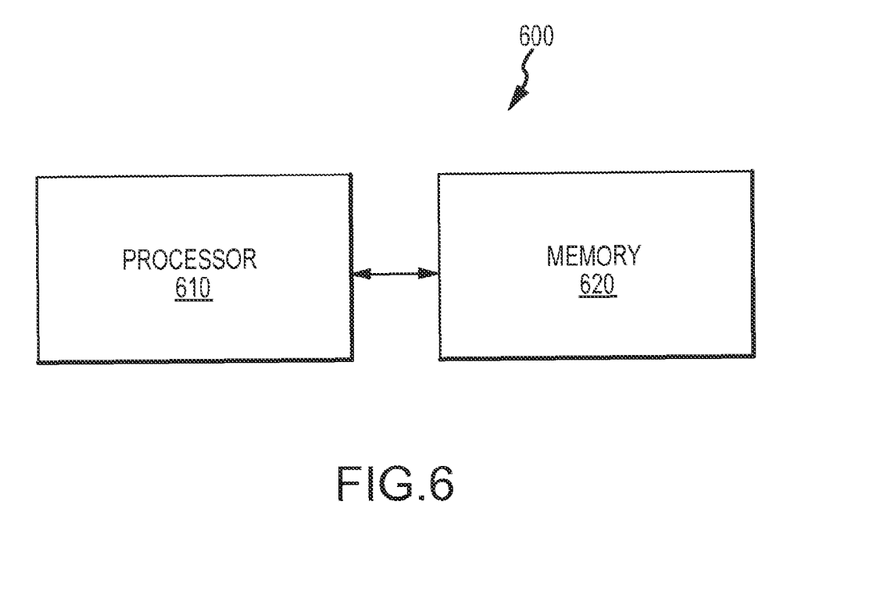
FIG. 6 illustrates an example of a device comprising a processor in communication with a memory for executing the processes disclosed in FIGS. 3, 4 and/or 5.

In one example, the illustrative components, flow diagrams, logical blocks, modules and/or algorithm steps described herein are implemented or performed with one or more processors. In one aspect, a processor is coupled with a memory which stores data, metadata, program instructions, etc. to be executed by the processor for implementing or performing the various flow diagrams, logical blocks and/or modules described herein. FIG. 6 illustrates an example of a device 600 comprising a processor 610 in communication with a memory 620 for executing the processes disclosed in FIGS. 3, 4 and/or 5, In one example, the device 600 is used to implement any of the algorithms illustrated in FIGS. 3-5. In one aspect, the memory 620 is located within the processor 610. In another aspect, the memory 620 is external to the processor 610. In one aspect, the processor includes circuitry for implementing or performing the various flow diagrams, logical blocks and/or modules described herein. In one aspect, the processor 610 and memory 620 work in conjunction with a receiver (not shown) or a receiving component of a transceiver (not shown).

Further aspects of the disclosure may become apparent from consideration of the drawings and the various descriptions of examples provided herein. A person skilled in the art will understand that other examples of the disclosures (although not specifically discussed herein) are possible and within the scope and spirit of the present disclosure, and that the details of the various examples disclosed herein may be modified in a number of respects, all without departing from the scope and/or spirit of the present disclosure. Thus, the following drawings and description are to be regarded as illustrative in nature and not restrictive.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

The invention claimed is:

1. A method for generating a radar image, comprising:
using a sensor resource manager (SRM) to predict when a moving target will perform a turning motion;
using the sensor resource manager (SRM) to schedule a radar waveform to collect a first plurality of data in a first domain;
collecting the first plurality of data in the first domain, wherein one or more of the first plurality of data include data of the moving target engaged in the turning motion at a rotational rate greater than a threshold;
converting the first plurality of data from the first domain to a second plurality of data in a second domain, wherein the second domain is a first two-dimensional transformation of the first domain using a range compression step and a Doppler (azimuth) compression step;
extracting one or more of the second plurality of data;
converting the one or more of the extracted second plurality of data to a third plurality of data in a third domain, wherein the third domain is a second two-dimensional transformation of the second domain;
phase compensating the third plurality of data; and
transforming the phase compensated third plurality of data to generate the radar image.

2. The method of claim 1 further comprising using a cartographic database to determine that the moving target is engaged in the turning motion.

3. The method of claim 1 further comprising measuring Doppler broadening of the moving target.

4. The method of claim 1, wherein the phase compensating step comprises one or more of the following:
applying a parametric polynomial phase correction;
eliminating one or more of range walk, range curvature, or higher order range motion; and
applying phase gradient autofocus.

5. The method of claim 1, further comprising computing an image quality metric of the radar image.

6. The method of claim 1, wherein the transforming step includes performing one or more of the following: Fourier transformation; amplitude weighting;
aperture weighting; apodization; or Doppler to cross-range transformation.

7. The method of claim 1 further comprising detecting and tracking the moving target to generate tracking data.

8. The method of claim 7, wherein the tracking data is one of the following: a) used for the extracting one or more of the second plurality of data, b) used for transforming the phase compensated third plurality of data to generate the radar image, or c) used for determining that the moving target is engaged in the turning motion.

9. The method of claim 7, further comprising using a spatial radar feature of the moving target for tracking.

10. The method of claim 9, wherein the spatial radar feature is one of the following: length, width, length profile, width profile, or spatial amplitude distribution.

11. The method of claim 1, further comprising identifying the radar image as a particular ground vehicle.

12. The method of clam 1, further comprising classifying the radar image into a pre-defined ground vehicle category.

13. The method of claim 1, wherein the threshold is between 1 degree per second and 20 degrees per second.

14. The method of claim 1, wherein the first domain is indexed by fast time and slow time, and the second domain is indexed by range and Doppler.

15. The method of claim 1, wherein the second domain is indexed by range and Doppler.

16. The method of claim 1, further comprising making a prediction of the turning motion based on a road network database or an a priori information.

17. The method of claim 1, wherein the third domain includes one of the following: a fast time dimension with a slow time dimension; or a fast time dimension with a pose angle dimension.

18. The method of claim 1, further comprising applying adaptive motion compensation to the third plurality of data following the phase compensating step.

19. The method of claim 1, wherein the extracting step includes cropping the second plurality of data to isolate a high value target (HVT) range Doppler blur.

20. The method of claim 1, wherein the phase compensating step includes representing range motion with a low order polynomial.

21. The method of claim 1, wherein the phase compensating step uses a phase gradient autofocus (PGA) algorithm.

22. The method of claim 1, wherein the phase compensating step includes deriving a range rate through a Hough transform.

23. An apparatus for generating a radar image, comprising:
- a sensor resource manager (SRM) configured to predict when a moving target will perform a turning motion, and to schedule a radar waveform to collect a first plurality of data in a first domain;
- a receiver configure to collect the first plurality of data in the first domain, wherein one or more of the first plurality of data include data of the moving target engaged in the turning motion at a rotational rate greater than a threshold; and
- a processor coupled with a memory storing software codes, wherein the software codes are instructions which when implemented by the processor cause the processor to:
  a) convert the first plurality of data from the first domain to a second plurality of data in a second domain, wherein the second domain is a first two-dimensional transformation of the first domain using a range compression step and a Doppler (azimuth) compression step;
  b) extract one or more of the second plurality of data;
  c) convert the one or more of the extracted second plurality of data to a third plurality of data in a third domain, wherein the third domain is a second two-dimensional transformation of the second domain;
  d) phase compensate the third plurality of data; and
  e) transform the phase compensated third plurality of data to generate the radar image.

24. The apparatus of claim 23 wherein the processor is further configured for using a cartographic database to determine that the moving target is engaged in the turning motion.

25. The apparatus of claim 23 wherein the processor is further configured for measuring Doppler broadening of the moving target.

26. The apparatus of claim 23, wherein the phase compensating software code further comprises one or more of the following:
- software code for applying a parametric polynomial phase correction;
- software code for eliminating one or more of range walk, range curvature, or higher order range motion; and
- software code for applying phase gradient autofocus.

27. The apparatus of claim 23 wherein the processor is further configured for computing an image quality metric of the radar image.

28. The apparatus of claim 23, wherein the transforming software code further comprises software code for performing one or more of the following:
Fourier transformation; amplitude weighting; aperture weighting; apodization; or Doppler to cross-range transformation.

29. The apparatus of claim 23 wherein the processor is further configured for detecting and tracking the moving target to generate tracking data.

30. The apparatus of claim 29, wherein the tracking data is one of the following: a) used for the extracting one or more of the second plurality of data, b) used for transforming the phase compensated third plurality of data to generate the radar image, or c) used for determining that the moving target is engaged in the turning motion.

31. The apparatus of claim 29 wherein the processor is further configured for using a spatial radar feature of the moving target for tracking.

32. The apparatus of claim 31, wherein the spatial radar feature is one of the following: length, width, length profile, width profile, or spatial amplitude distribution.

33. The apparatus of claim 23 wherein the processor is further configured for identifying the radar image as a particular ground vehicle.

34. The apparatus of clam 23 wherein the processor is further configured for classifying the radar image into a predefined ground vehicle category.

35. The apparatus of claim 23, wherein the threshold is between 1 degree per second and 20 degrees per second.

36. The apparatus of claim 23, wherein the first domain is indexed by fast time and slow time, and the second domain is indexed by range and Doppler.

37. The apparatus of claim 23, wherein the second domain is indexed by range and Doppler.

38. The apparatus of claim 23, wherein the processor is further configured for making a prediction of the turning motion based on a road network database or an a priori information.

39. The apparatus of claim 23, wherein the third domain includes one of the following: a fast time dimension with a slow time dimension; or a fast time dimension with a pose angle dimension.

40. The apparatus of claim 23 wherein the processor is further configured for applying adaptive motion compensation to the third plurality of data following the phase compensating step.

41. The apparatus of claim 23, wherein the extracting software code further comprises software code for cropping the second plurality of data to isolate a high value target (HVT) range Doppler blur.

42. The apparatus of claim 23, wherein the phase compensating software code further comprises software code for representing range motion with a low order polynomial.

43. The apparatus of claim 23, wherein the phase compensating software code further comprises software code for using a phase gradient autofocus (PGA) algorithm.

44. The apparatus of claim 23, wherein the phase compensating software code further comprises software code for deriving a range rate through a Hough transform.

* * * * *